(12) United States Patent
Baughman et al.

(10) Patent No.: US 9,536,204 B2
(45) Date of Patent: *Jan. 3, 2017

(54) COHORT HALF LIFE FORECASTING COMBINATION FROM A CONFIDENT JURY

(71) Applicant: International Business Machines Corporation, Armonk, NY (US)

(72) Inventors: Aaron K. Baughman, Silver Spring, MD (US); Christian Eggenberger, Wil (CH); Peter K. Malkin, Ardsley, NY (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,425

(22) Filed: Mar. 21, 2016

(65) Prior Publication Data

US 2016/0203410 A1 Jul. 14, 2016

Related U.S. Application Data

(63) Continuation of application No. 14/591,403, filed on Jan. 7, 2015, now Pat. No. 9,342,790.

(51) Int. Cl.
G06F 9/44 (2006.01)
G06N 7/02 (2006.01)
G06N 7/08 (2006.01)
G06N 7/00 (2006.01)
G06N 5/04 (2006.01)

(52) U.S. Cl.
CPC .............. *G06N 7/005* (2013.01); *G06N 5/043* (2013.01)

(58) Field of Classification Search
USPC .......................................................... 706/52
See application file for complete search history.

(56) References Cited

U.S. PATENT DOCUMENTS 6,449,603 B1 9/2002 Hunter
6,792,399 B1 9/2004 Phillips et al.
7,377,431 B2 5/2008 Urken
(Continued)

FOREIGN PATENT DOCUMENTS

CN 103076635 A 5/2013

OTHER PUBLICATIONS

Evolution of the Probability of an MPM (Multiple Primary Malignancy) after a First Colon Tumor Alberto Cavallo; Cocetta Dodaro; Andrea Renda Bioinformatics and Biomedicine, 2009. BIBM '09. IEEE International Conference on Year: 2009 pp. 252-256, DOI: 10.1109/BIBM.2009.11 IEEE Conference Publications.*

(Continued)

*Primary Examiner* — Michael B Holmes
(74) *Attorney, Agent, or Firm* — Law Office of Jim Boice

(57) ABSTRACT

A forecasting cohort includes a first set of forecasting algorithms and a second set of forecasting algorithms. A half-life of each of the first set of forecasting algorithms and the second set of forecasting algorithms are determined. A half-life weight for each of the first set of forecasting algorithms and the second set of forecasting algorithms at a subsequent time are determined, such that the half-life weights decrease an effect of a forecasting algorithm as time elapses. A confidence level of the forecasting cohort at the subsequent time is determined and used to adjust resource usage.

20 Claims, 3 Drawing Sheets

(56) References Cited

U.S. PATENT DOCUMENTS

| | | | |
|---|---|---|---|
| 8,229,824 B2 | 7/2012 | Berg et al. | |
| 8,700,516 B2 | 4/2014 | Bell et al. | |
| 8,712,945 B2 | 4/2014 | Baughman et al. | |
| 9,336,121 B2* | 5/2016 | Malkin | G06F 11/3636 |
| 9,342,436 B2* | 5/2016 | Malkin | G06F 11/3636 |
| 9,342,790 B1* | 5/2016 | Baughman | G06N 5/043 |
| 9,372,086 B2* | 6/2016 | Cardonha | G01C 21/20 |
| 9,385,934 B2* | 7/2016 | Baughman | H04L 43/16 |
| 9,406,038 B2* | 8/2016 | Cantor | G06Q 10/0633 |
| 2003/0233274 A1 | 12/2003 | Urken et al. | |
| 2012/0095948 A1 | 4/2012 | Byrne et al. | |
| 2014/0282386 A1 | 9/2014 | Malkin | |
| 2014/0282388 A1 | 9/2014 | Malkin | |
| 2014/0316701 A1 | 10/2014 | Cardonha | |
| 2014/0316702 A1 | 10/2014 | Cardonha | |
| 2014/0316755 A1 | 10/2014 | Li et al. | |
| 2015/0019069 A1 | 1/2015 | Baughman | |
| 2015/0019447 A1 | 1/2015 | Baughman | |
| 2015/0254569 A1 | 9/2015 | Baughman | |
| 2015/0287057 A1 | 10/2015 | Baughman | |
| 2015/0288571 A1 | 10/2015 | Baughman | |
| 2015/0288573 A1 | 10/2015 | Baughman | |
| 2015/0293899 A1 | 10/2015 | Baughman | |
| 2015/0294216 A1 | 10/2015 | Baughman | |
| 2015/0350108 A1 | 12/2015 | Baughman | |

OTHER PUBLICATIONS

Star Development and Protocol Comparison Liam M. Fisk; Aaron J. Le Compte; Geoffrey M. Shaw; Sophie Penning; Thomas Desaive; J. Geoffrey Chase IEEE Transactions on Biomedical Engineering Year: 2012, vol. 59, Issue: 12 pp. 3357-3364, DOI: 10.1109/TBME.2012.2214384 IEEE Journals & Magazines.*

Blood Glucose Prediction Using Stochastic Modeling in Neonatal Intensive Care Aaron J. Le Compte; Dominic S. Lee; J. Geoffrey Chase; Jessica Lin; Adrienne Lynn; Geoffrey M. Shaw IEEE Transactions on Biomedical Engineering Year: 2010, vol. 57, Issue: 3 pp. 509-518, DOI: 10.1109/TBME.2009.2035517 IEEE Journals & Magazines.*

R. Giuliano-Antonini, "Some Generalized Versions of the Condorcet Jury Theorem", Trata Mountains Mathematical Publications, 2005, vol. 31, pp. 39-54.

S. Lim et al., "Purification and Characterization of Archaoglobus Fulgidus Shikimate 5-Dehydrogenase", IEEE, Proceedings of the Second Joint EMBS/BMES Conference, 2002, pp. 101-702.

P. Thavikulwat, "Life Span as the Measure of Performance and Learning in a Business Gaming Simulation", Sage Publications, Simulation & Gaming, 2012, No. 2, 236-256.

A. Steed et al., "Networked Graphics Building Networked Games and Virtual Environments", Morgan Kaufmann Publishers, 2010, pp. 1-535.

T. Adlin et al., "The Essential Persona Lifecycle: Your Guide to Building and Using Personas", Morgan Kaufmann Publishers, 2010, pp. 1-235.

K. Ma et al., "Weight Self-Learning Based Combination Forecasting of Product Diffusion", IEEE, Second International Conference on Intelligent Computation Technology and Automation, 2009, pp. 427-431.

W. Di et al., "AFTER-IQEA Combination Forecasting Model for Cosmetics Sales Forecasting", IEEE, Emergency Management and Management Sciences (ICEMMS), 2010 IEEE International Conference on, 2010, pp. 75-78.

G. Steinmann et al., "Using Simulation to Evaluate Call Forecasting Algorithms for Inbound Call Center", IEEE, Winter Simulation Conference (WSC), 2013, pp. 1132-1139.

M. Yildirimoglu et al., "Experienced Travel Time Prediction for Freeway Systems", IEEE, Intelligent Transportation Systems, 2012, pp. 570-575.

C. Rottondi et al., "An Energy Management System for a Smart Office Environment", IEEE, International Conference and Workshops on Networked Systems, 2015, pp. 1-6.

B.A. Hoverstad et al., "Short-Term Load Forecasting With Seasonal Decomposition Using Evolution for Parameter Tuning", IEEE, IEEE Journals & Magazines, IEEE Transactions on Year 2015, vol. 6, No. 4, pp. 1904-1913.

* cited by examiner

COHORT HALF LIFE FORECASTING COMBINATION FROM A CONFIDENT JURY

BACKGROUND

The present disclosure relates to computer systems, and specifically to resource usage prediction by computer systems by a cohort of forecasting algorithms. Still more specifically, the present disclosure relates to resource usage prediction based on half-life weightings of forecasting algorithms.

SUMMARY

A method, system, and/or computer program product implements a forecasting cohort. One or more processors generate a forecasting cohort of forecasting algorithms, where the forecasting cohort includes a first set of forecasting algorithms of a first type of forecasting algorithm and a second set of forecasting algorithms of a second type of forecasting algorithm. Processor(s) determine a half-life of each of the first set of forecasting algorithms and the second set of forecasting algorithms, where the half-life describes a subsequent time at which a forecasting algorithm has reached half of its forecast horizon as measured from an initial time. Processor(s) determine a half-life weight for each of the first set of forecasting algorithms and the second set of forecasting algorithms, where half-life weights decrease an effect of a forecasting algorithm as time elapses. Processor(s) determine a confidence level of the forecasting cohort at the subsequent time, where the confidence level is based on the half-life weight of each of the first set of forecasting algorithms and the second set of forecasting algorithms. Processor(s) utilize the confidence level of the forecasting cohort at the subsequent time to adjust resource usage. Processor(s) receive sensor readings from a device, where the sensor readings describe current conditions of the device, and wherein the device includes resources. Processor(s) predict future usage of the resources in the device based on the confidence level of the forecasting cohort. Processor(s) reallocate the resources used by the device based on the predicted future usage.

DETAILED DESCRIPTION

Figure 1:
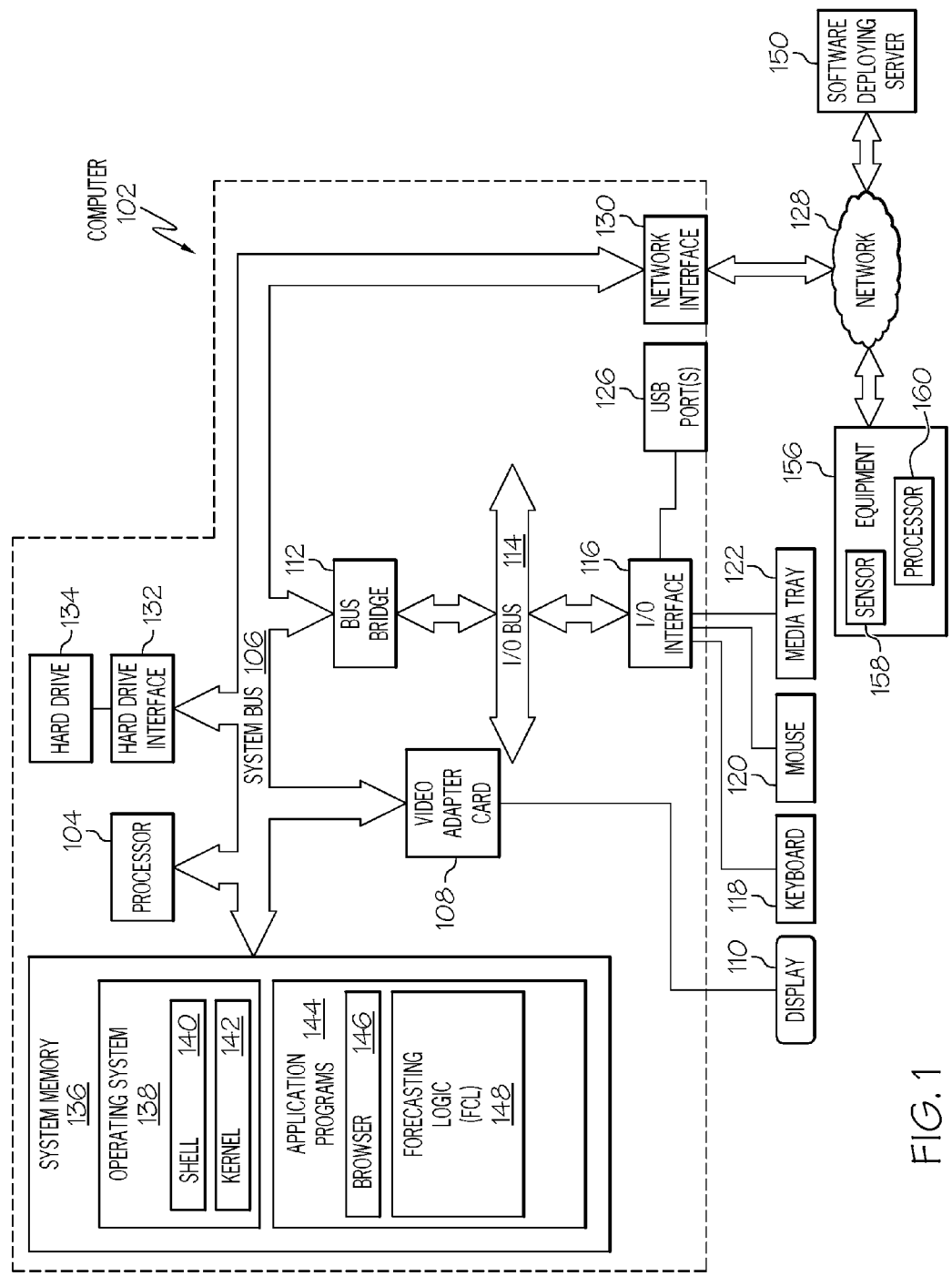
FIG. 1 depicts an exemplary system and network in which the present disclosure may be implemented.

When combined into a forecasting cohort, some forecasting algorithms ("forecasters") in the forecasting cohort are better than others over a time horizon. For example, one forecaster might have excellent accuracy over a 24 hour period while a second forecaster is excellent over a 2 hour period. However, the second forecaster may not be very accurate over a 24 hour period.

The present invention thus presents a method to combine forecasters of different time horizons into a natural group that follows the Condorcet jury theorem, which states that if each voter in a jury has a greater than ½ confidence of getting an answer correct, then by adding additional such voters, the total vote approaches a guaranteed correct decision. Conversely, voters in the jury that have a less than ½ confidence of getting the answer correct make the jury (i.e., cohort) less reliable.

In accordance with one or more embodiments of the present invention, a forecasting cohort of forecasting algorithms includes multiple forecasting algorithms that have different time look aheads (forecast horizons). The forecast horizon determines how far into the future the forecast will trend. As a forecaster/forecasting algorithm goes further out into the future, the less certain the forecast value. The present invention solves this uncertainty problem with half-life weights.

A half-life equation used as a basis of half-life weights for forecasting algorithms in one or more embodiments of the present invention is as follows:

$$N(t) = N_o e^{-\frac{t}{\tau}} \qquad \text{Equation 1}$$

where:
$N_o$=the original value;
e=an exponential decay factor;
t=the amount of time that has passed; and
τ=the average half life time.

When used in a forecasting cohort of forecasting algorithms, $N_o$ is equal to 1 since that is the starting maximum weight. Thus, then Equation 1 simplifies to:

$$N(t) = e^{-\frac{t}{\tau}} \qquad \text{Equation 2}$$

The half-life is half of the forecast time horizon, such that tau (τ)=h half. For example, if a forecast time horizon (i.e., the time period for which a forecaster is making predictions) is 2 hours, then the half-life of the prediction horizon is 1 hour.

The numerator of time passed, t, in the above simplified Equation 2 is equal to $m_r$. In accordance with one or more embodiments of the present invention, an alpha value (α) is added to adjust the decay value as it is learned over time. That is, a is an adjustment factor to correct half-life weights as described herein. This adjustment factor can be based on past accuracy rates when using a particular forecasting algorithm.

As described herein, a decay factor for a forecasting cohort gradually reduces weights of forecasting algorithms in the forecasting cohort according to their half-life. Converting Equation 2 from a natural log (e) formula to a base 2 formula and adding an α correction factor, the resulting equation used to adjust such half-life weights derived from Equation 2 is thus:

$$2^{-\frac{m_r}{h_{\frac{1}{2}}} * \alpha} \qquad \text{Equation 3}$$

where $m_r$ is an amount of time that has passed since the initial time,
$h_{1/2}$ is a half-life of the forecasting algorithm, and
α is a correction factor derived from historical data for the half-life weight.

As stated above, the alpha value (α) is the Condorcet jury theorem learning variable, which is derived from a history of accuracy for various forecasting algorithms when used in previous cohorts/projects.

Using Equation 3, if the passed time is 30 and half-life is 30, and α is 1, then the half-life weight is ½, according to:

$$2^{-\frac{30}{30}*1} = 2^{-1} = 1/2$$

Each forecaster, FWc, has a half-life weight equation:

$$fw_c = 2^{-\frac{m_T}{h_1}*\alpha} \quad \text{Equation 4}$$

As the present invention loops through a forecast interval, a set of forecasting algorithms (f) make up a cohort, C, such that:

$$f \in C \quad \text{Equation 5}$$

Through time, a time splice is applied to each forecasting algorithm for a forecast weight. The sum of all forecast weights is equal to 1:

$$\sum_{f=0}^{|f|} \sum_{t=x}^{x} f_f w_x = 1 \quad \text{Equation 6}$$

After all of the weights are calculated for all forecasters in a cohort for each time step, each of the forecasts are multiplied and added together, such that:

$$\sum_{x=t}^{|T|} = \sum_{f=0}^{|f|} f_f w_x * f_f(x) \quad \text{Equation 7}$$

where $$\sum_{x=t}^{|T|}$$

is a sum of all time slices taken during a life of the forecasting cohort,
where $$\sum_{f=0}^{|f|} f_f w_x$$

is a sum of all forecasting algorithm weights,
where
$f_f w_x$ represents all half-life weights of the forecasting algorithms, and
where
$f_f(x)$ represents all forecasting algorithms in the forecasting cohort.

The forecasting cohort thus has a combined score for each time step, with the end result being an array of combined scores for each time step in the forecast period.

The present invention thus presents a method to relate half-life weight values to the Condorcet jury theorem of being ½ or greater confident that a solution is correct. As a result, a cohort of forecasters (forecasting algorithms) is combined into a jury to forecast the future. To ensure that each forecaster has ½ or greater confidence, a half-life equation is used to lessen the confidence of the cohort when the half-confidence level is approached and passed, as described below. An additional weight term is used to adjust the weights as accuracy is learned.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, and/or equipment 156.

Exemplary computer 102 includes a processor 104 that is coupled to a system bus 106. Processor 104 may utilize one or more processors, each of which has one or more processor cores. A video adapter card 108, which drives/supports a display 110, is also coupled to system bus 106. In one or more embodiments of the present invention, video adapter card 108 is a hardware video card. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a forecasting cohort logic (FCL) 148. FCL 148 includes code for implementing the processes described below, including those described in FIGS. 2-3. In one embodiment, computer 102 is able to download FCL 148 from software deploying server 150, including in an on-demand basis, wherein the code in FCL 148 is not downloaded until needed for execution. Note further that, in one embodiment of the present invention, software deploying server 150 performs all of the functions associated with the present invention (including execution of FCL 148), thus freeing computer 102 from having to use its own internal computing resources to execute FCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
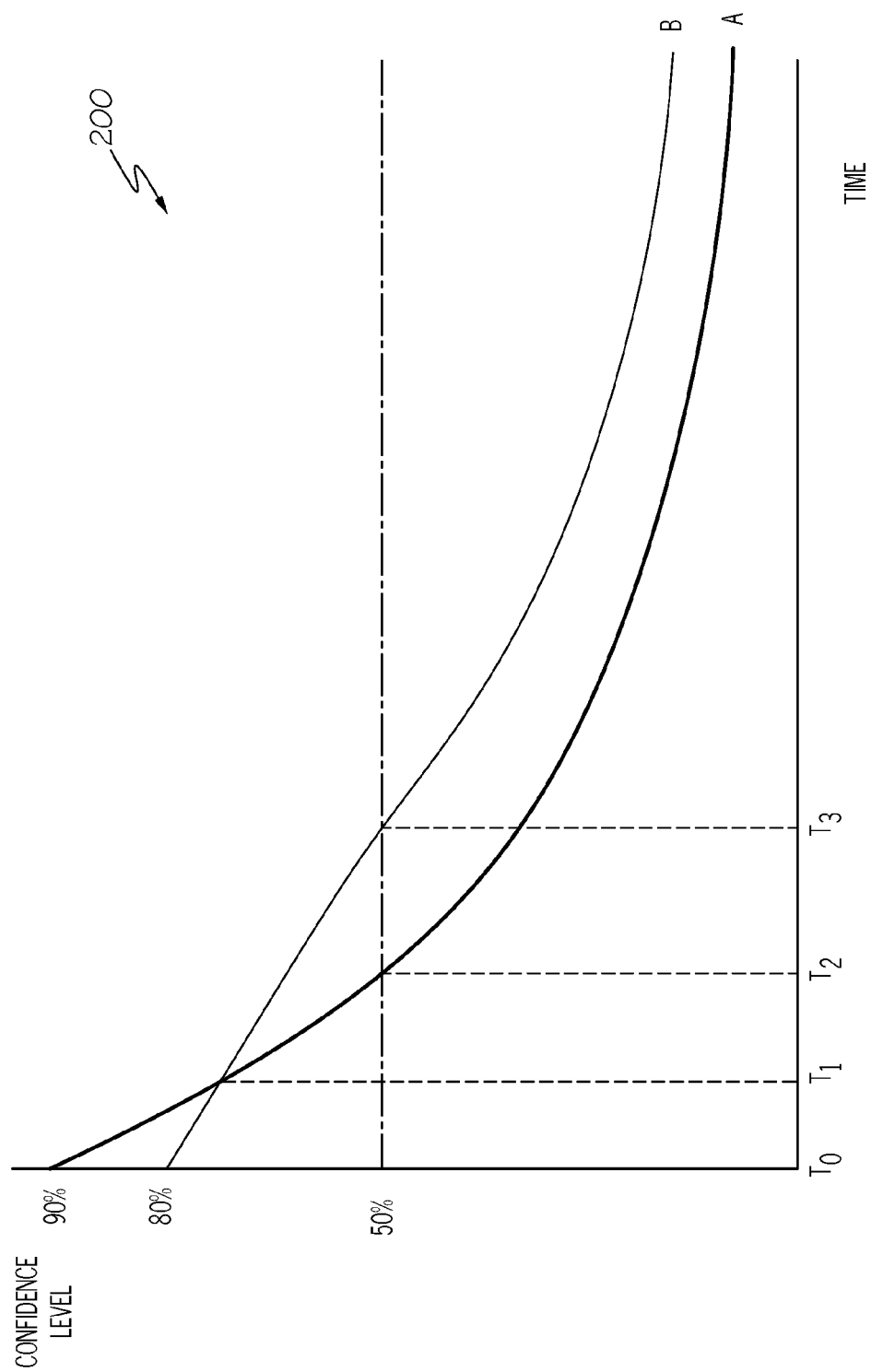
FIG. 2 is a graph of confidence levels of two types of prediction algorithms within a same forecasting cohort made up of prediction algorithms.

With reference now to FIG. 2, a graph 200 of confidence levels of two types of prediction algorithms (prediction algorithm A and prediction algorithm B) within a same forecasting cohort made up of prediction algorithms is presented. Events predicted by prediction algorithm A and prediction algorithm B include, but are not limited to, prices for certain products/commodities, usage or resources (including software, hardware, equipment, roads, etc.), weather events, etc.

As depicted in FIG. 2, prediction algorithm A has an initial confidence level of 90%. That is, at time $T_0$ (the beginning of a prediction horizon), prediction algorithm A is correct 90% of the time (according to historical data describing the use of prediction algorithm A) when predicting what will happen (i.e., an "event") within a next time frame (e.g., the next 30 minutes). Similarly, prediction algorithm B has a historical record of being accurate 80% of the time in predicting what will happen within that same 30 minutes. Thus, initially, prediction algorithm A is better than prediction algorithm B. However, as time passes, prediction algorithm B becomes more accurate than prediction algorithm A, which has a sharper decay rate (i.e., the accuracy of prediction algorithm A degrades faster than that of prediction algorithm B). As described herein, this prediction accuracy decay is calculated according to half-life weight equations, such as Equation 4 above.

Thus, between initial time $T_0$ and subsequent time $T_1$ in graph 200, a forecasting cohort (i.e., a cohort of prediction algorithms) is more accurate if heavily populated with prediction algorithms such as prediction algorithm A. According to the Condorcet jury theorem, loading the cohort with highly confident prediction algorithms such as prediction algorithm A will ensure that the cohort is more likely to be accurate between initial time $T_0$ and subsequent time $T_1$.

However, between time $T_1$ and time $T_2$, prediction algorithm A has degraded in accuracy (as calculated with the half-life weight described above), such that a forecasting cohort that is heavily populated with prediction algorithms such as prediction algorithm B is more accurate between time $T_1$ and time $T_2$. However, prediction algorithm A is still more than 50% confident in being accurate between time $T_1$ and time $T_2$, and thus is still a positive contributor to the forecasting cohort.

However, between time $T_2$ and time $T_3$, prediction algorithm A is not only less accurate than prediction algorithm B, but prediction algorithm A is now also a liability to the forecasting cohort. That is, between time $T_2$ and time $T_3$, prediction algorithm makes the forecasting cohort become less reliable, since the accuracy of prediction algorithm A is likely to be wrong (i.e., has an accuracy level of less than 50%). Since every instance of a prediction algorithm such as prediction algorithm A makes the forecasting cohort less reliable, then the greater the number of prediction algorithms such as prediction algorithm A that are in the forecasting cohort, the less reliable the forecasting cohort becomes, even with the presence of still-reliable prediction algorithm(s) B.

Finally, after time $T_3$, all prediction algorithms (prediction algorithm(s) A and prediction algorithm(s) B) are less than 50% accurate, and the forecasting cohort should not be trusted at all.

Figure 3:
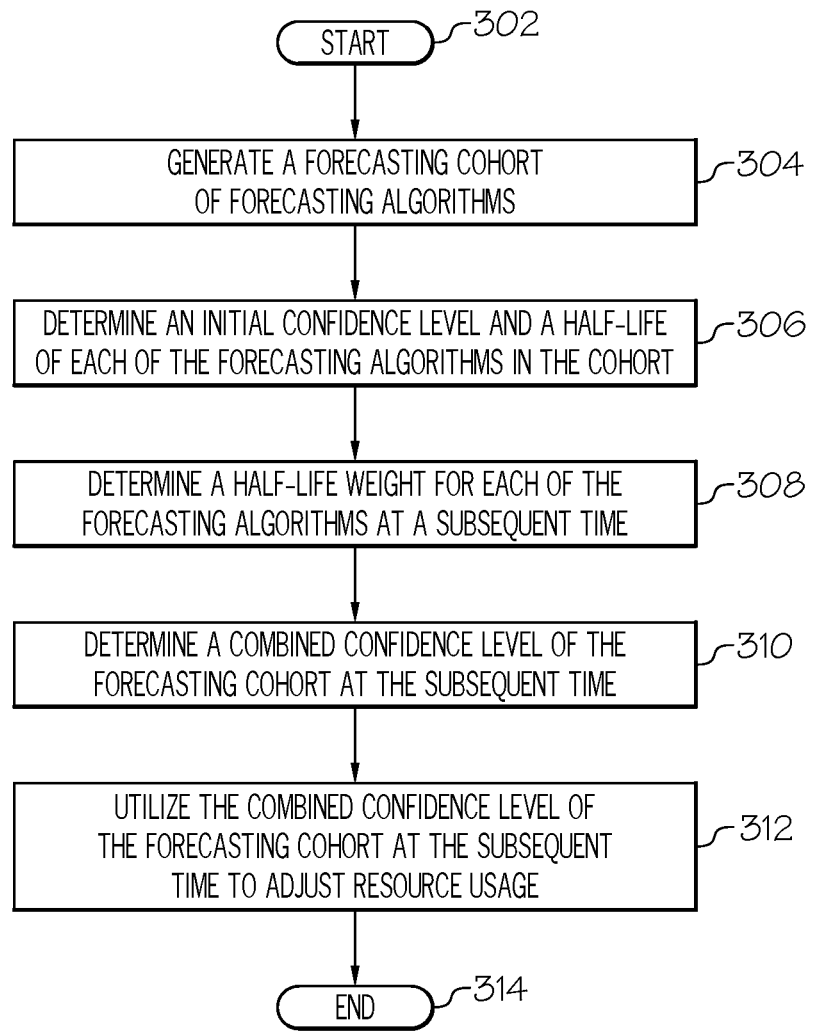
FIG. 3 is a high level flow-chart of one or more operations performed by one or more hardware devices to implement a forecasting cohort.

With reference now to FIG. 3, a high level flow-chart of one or more operations performed by one or more hardware devices to implement a forecasting cohort is presented.

After initiator block 302, one or more processors generate a forecasting cohort of forecasting algorithms, as described in block 304. The forecasting cohort includes a first set of forecasting algorithms of a first type of forecasting algorithm, and a second set of forecasting algorithms of a second type of forecasting algorithm. That is, the forecasting cohort is made up of multiple forecasting algorithms. However, each of the forecasting algorithms has a different forecast horizon, such that the different types of forecasting algorithms are likely to have different effects on the overall reliability of the forecasting cohort at different time slices.

As described in block 306, one or more processors determine an initial confidence level and a half-life of each of the first set of forecasting algorithms and the second set of forecasting algorithms, where the initial confidence level describes an accuracy level of each of the forecasting algorithms at an initial time in predicting a condition, and where the half-life describes a subsequent time at which a forecasting algorithm has reached half of its forecast horizon. Thus, as described herein, an initial confidence level (e.g., 90% for forecasting algorithm A shown in FIG. 2) is established. This confidence level can be based on historical data indicating how accurate a particular forecasting algorithm has been in the past, including a time window ("forecast horizon") for which the forecasting algorithm is designed (e.g., to be accurate for the next 2 hours). The half-life is thus half the time that the forecasting algorithm was designed for (i.e., 1 hour for a 2 hour forecasting algorithm).

As described in block 308, one or more processors then determine a half-life weight for each of the first set of forecasting algorithms and the second set of forecasting algorithms at a subsequent time that is subsequent to the initial time. The half-life weights decrease an effect of a forecasting algorithm as time elapses. The half-life weight formulas described above thus reduce the impact of a particular forecasting algorithm such that the particular forecasting algorithm has less impact on the overall trustworthiness (accuracy) of the forecasting cohort. As described herein, the half-life weight formulas are a function of what the forecast horizon is for a particular forecasting algorithm. Thus, the weight (impact) of a short-horizon forecasting algorithm will differ from the weight (impact) of a long-horizon forecasting algorithm as time passes, since the short-horizon forecasting algorithm loses its effectiveness/impact/trustworthiness sooner that a long-horizon forecasting algorithm.

As described in block 310, one or more processors then determine a combined confidence level of the forecasting cohort at the subsequent time, where the combined confidence level is based on the initial confidence level and the half-life weight of each of the first set of forecasting algorithms and the second set of forecasting algorithms. This combined confidence level, using formulas described above, thus provide a point-in-time confidence level for the forecasting cohort, based on what types of forecasting algorithms are in play (i.e., short-term versus long-term) and where a time slice is on the forecasting horizon.

Once a confidence level for the forecasting cohort is established, it is then utilized in a technical manner to improve the operation of a resource, including a computer, industrial equipment, manufacturing machinery, etc. Thus, as described in block 312 of FIG. 3, one or more processors then utilize the combined confidence level of the forecasting cohort at the subsequent time to adjust resource usage. The flow-chart shown in FIG. 3 terminates at terminator block 314.

For purposes of explanation, assume that one or more processors receive sensor readings from a device (e.g., processor 104 receives sensor readings from sensor 158 that describe the operational conditions (i.e., load demands, temperature, throughput, etc.) of equipment 156 shown in FIG. 1. The half-life time weighted forecasting cohort described herein is thus used to predict, by one or more processors, a future usage of the resources in the device based on the combined confidence level of the forecasting cohort. Based on this forecasted future usage, resources used by the device can be reallocated. For example, if the forecasting cohort predicts a shortage of memory in the next two hours for a particular server, then additional memory (e.g., from a "cloud" of on-line storage resources) can be allocated to that particular server.

Thus, in one embodiment of the present invention, resources to be reallocated for use by the device (e.g., a server) are hardware resources. In another or the same embodiment of the present invention, the resources to be reallocated are software resources, such as operating systems, applications, etc.

In one embodiment of the present invention, the reallocated resources are within the device where the sensors are taking readings. For example, additional memory, processors, etc. in a server can be reallocated/reconfigured in response to a sensor providing readings to the forecasting cohort of forecasting algorithms indicating an additional need of such hardware resources in the future. Alternatively, the reallocated resources may be from an external source (e.g., the "cloud").

Thus, sensor readings from the device are used in combination with the forecasting cohort (and its confidence level at a particular point in time) in order to accurately adjust resource reallocation.

In one embodiment of the present invention, sensor readings from the monitored device/resource are taken at the initial time. This allows the forecasting cohort to have a well-defined arc of reliability based on the half-life weights described herein. However, in another embodiment, sensor readings from the monitored device are taken at the subsequent time, thus allowing the forecasting cohort to be dynamically adjusted. That is, sensor readings taken at the initial time (e.g., time $T_0$ in FIG. 2) are utilized by the processors generating the confidence level of the forecasting cohort to define a certain arc in the reliability/accuracy of the forecasting cohort, such that the level of reliability/accuracy of the forecasting cohort is known for any point in time in the future (before being reached). However, by adjusting the confidence level of the confidence level of the forecasting cohort with updated sensor readings (e.g., at a subsequent time such as time $T_2$ in FIG. 2), this confidence level can be fine-tuned to be more accurate.

In one embodiment of the present invention, the future resource usage is predicted at the initial time. That is, based on the weights of the forecasting algorithms and their quantity (i.e., how many of each type of weighted forecasting algorithm is found in the forecasting cohort), a determination can be made as to how reliable the forecasting cohort is at the initial time $T_0$ shown in FIG. 2. However, in a preferred embodiment of the present invention, the predictions made from the forecasting cohort are made at a subsequent time (e.g., time $T_1$ or time $T_2$ in FIG. 2).

As described above, the half-life weight of a forecasting algorithm is:

$$2^{-\frac{m_r}{h_{1/2}} * \alpha}$$

where $m_r$ is an amount of time that has passed since the initial time, $h_{1/2}$ is a half-life of the forecasting algorithm, and $\alpha$ is a correction factor derived from historical data for the half-life weight, and wherein the combined confidence level is calculated according to:

$$\sum_{x=t}^{|T|} \sum_{f=0}^{|f|} f_f w_x * f_f(x)$$

where $$\sum_{x=t}^{|T|}$$

is a sum of all time slices taken during a life of the forecasting cohort, where $$\sum_{f=0}^{|f|} f_f w_x$$

is a sum of all forecasting algorithm weights, where $f_f w_x$ represents all half-life weights of the forecasting algorithms, and where $f_f(x)$ represents all forecasting algorithms in the forecasting cohort.

In one embodiment of the present invention, a device (e.g., equipment 156 shown in FIG. 1) includes a sensor (e.g., sensor 158) and one or more processors (e.g., processor 160). The device may be a computer, a manufacturing device (e.g., a machine such as a lathe), an industrial device (e.g., a pump used in a refinery), etc. The sensor 158 detects a current state of the device, such as its current CPU load (i.e., usage of the processor 160 itself), a rotating speed (e.g., in the case of a lathe), a fluid throughput (e.g., in the case of a pump), etc.

Thus, the sensor develops sensor readings from the device that describe current conditions of the device. The processors utilize these sensor readings to perform the following steps:

1) generating a forecasting cohort of forecasting algorithms, where the forecasting cohort comprises a first set of forecasting algorithms of a first type of forecasting algorithm, and where the forecasting cohort further comprises a second set of forecasting algorithms of a second type of forecasting algorithm;

2) determining an initial confidence level and a half-life of each of the first set of forecasting algorithms and the second set of forecasting algorithms, where the initial confidence level describes an accuracy level of each of the forecasting algorithms at an initial time in predicting a condition, and where the half-life describes a subsequent time at which a forecasting algorithm has reached half of its forecast horizon;

3) determining a half-life weight for each of the first set of forecasting algorithms and the second set of forecasting algorithms at a subsequent time that is subsequent to the initial time, where half-life weights decrease an effect of a forecasting algorithm as time elapses;

4) determining a combined confidence level of the forecasting cohort at the subsequent time, where the combined confidence level is based on the initial confidence level and the half-life weight of each of the first set of forecasting algorithms and the second set of forecasting algorithms;

5) predicting future usage of the resources by the device based on the combined confidence level of the forecasting cohort; and 6) reallocating resources based on the predicted future usage, where the half-life weight is calculated according to:

$$2^{-\frac{m_r}{h_{1/2}} * \alpha}$$

where $m_r$ is an amount of time that has passed since the initial time, $h_{1/2}$ is a half-life of a forecasting algorithm, and $\alpha$ is a correction factor derived from historical data for the half-life weight, and wherein the combined confidence level is calculated according to:

$$\sum_{x=t}^{|T|} \sum_{f=0}^{|f|} f_f w_x * f_f(x)$$

where $$\sum_{x=7}^{|T|}$$

is a sum of all time slices taken during a life of the forecasting cohort, where $$\sum_{f=0}^{|f|} f_f w_x$$

is a sum of all forecasting algorithm weights, where $f_f w_x$ represents all half-life weights of the forecasting algorithms, and where $f_f(x)$ represents all forecasting algorithms in the forecasting cohort.

As described herein, a group of forecasters is combined together that follows the Condorcet jury theorem. The theorem is implemented with a half-life equation and an adjustment weight to create a cohort of forecasters that approach better accuracy as more forecasters are added.

The present invention learns over time how to shift the half-life equation to guarantee better performance over a time horizon. In addition, additional forecasters can be added and the relative confidence of each forecast is averaged together. Less confident forecasters that are used early in the Condorcet jury theorem will thus have less contribution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   generating, by one or more processors, a forecasting cohort of forecasting algorithms, wherein the forecasting cohort comprises a first set of forecasting algorithms of a first type of forecasting algorithm, and wherein the forecasting cohort further comprises a second set of forecasting algorithms of a second type of forecasting algorithm;
   determining, by one or more processors, a half-life of each of the first set of forecasting algorithms and the second set of forecasting algorithms, wherein the half-life describes a subsequent time at which a forecasting algorithm has reached half of its forecast horizon as measured from an initial time;
   determining, by one or more processors, a half-life weight for each of the first set of forecasting algorithms and the second set of forecasting algorithms, wherein half-life weights decrease an effect of a forecasting algorithm as time elapses;
   determining, by one or more processors, a confidence level of the forecasting cohort at the subsequent time, wherein the confidence level is based on the half-life weight of each of the first set of forecasting algorithms and the second set of forecasting algorithms;
   utilizing, by one or more processors, the confidence level of the forecasting cohort at the subsequent time to adjust resource usage;
   receiving, by one or more processors, sensor readings from a device, wherein the sensor readings describe current conditions of the device, and wherein the device includes resources;
   predicting, by one or more processors, future usage of the resources in the device based on the confidence level of the forecasting cohort; and
   reallocating, by one or more processors, the resources used by the device based on the predicted future usage.

2. The method of claim 1, wherein the resources used by the device are software resources.

3. The method of claim 1, wherein the resources used by the device are hardware resources.

4. The method of claim 1, wherein reallocated resources are in the device.

5. The method of claim 1, wherein the sensor readings are received at the initial time.

6. The method of claim 1, wherein the sensor readings are received at the subsequent time.

7. The method of claim 1, wherein the half-life weight of a forecasting algorithm is:

$$2^{-\frac{m_r}{h_{1/2}} * \alpha}$$

where $m_r$ is an amount of time that has passed since the initial time,
$h_{1/2}$ is a half-life of the forecasting algorithm, and
$\alpha$ is a correction factor derived from historical data for the half-life weight, and wherein a combined confidence level is calculated according to:

$$\sum_{x=t}^{|T|} \sum_{f=0}^{|f|} f_f w_x * f_f(x)$$

where $$\sum_{x=t}^{|T|}$$

is a sum of all time slices taken during a life of the forecasting cohort,
where $$\sum_{f=0}^{|f|} f_f w_x$$

is a sum of all forecasting algorithm weights,
where
$f_f w_x$ represents all half-life weights of the forecasting algorithms, and where
$f_f(x)$ represents all forecasting algorithms in the forecasting cohort.

8. The method of claim 1, wherein the resource usage is predicted at the initial time.

9. The method of claim 1, wherein the resource usage is predicted at the subsequent time.

10. A computer program product comprising one or more computer readable storage mediums, and program instructions stored on at least one of the one or more storage mediums, the stored program instructions comprising:
   program instructions to generate a forecasting cohort of forecasting algorithms, wherein the forecasting cohort comprises a first set of forecasting algorithms of a first type of forecasting algorithm, and wherein the forecasting cohort further comprises a second set of forecasting algorithms of a second type of forecasting algorithm;
   program instructions to determine a half-life of each of the first set of forecasting algorithms and the second set of forecasting algorithms, wherein the half-life describes a subsequent time at which a forecasting algorithm has reached half of its forecast horizon as measured from an initial time;
   program instructions to determine a half-life weight for each of the first set of forecasting algorithms and the second set of forecasting algorithms, wherein half-life weights decrease an effect of a forecasting algorithm as time elapses;
   program instructions to determine a confidence level of the forecasting cohort at the subsequent time, wherein the confidence level is based on the half-life weight of each of the first set of forecasting algorithms and the second set of forecasting algorithms;
   program instructions to utilize the confidence level of the forecasting cohort at the subsequent time to adjust resource usage;
   program instructions to receive sensor readings from a device, wherein the sensor readings describe current conditions of the device, and wherein the device includes resources;

program instructions to predict future usage of the resources in the device based on the confidence level of the forecasting cohort; and program instructions to reallocate the resources used by the device based on the predicted future usage.

11. The computer program product of claim 10, wherein the resources used by the device are software resources.

12. The computer program product of claim 10, wherein the resources used by the device are hardware resources.

13. The computer program product of claim 10, wherein reallocated resources are in the device.

14. The computer program product of claim 10, wherein the sensor readings are received at the initial time.

15. The computer program product of claim 10, wherein the half-life weight of a forecasting algorithm is:

$$2^{-\frac{m_r}{h_{1/2}}*\alpha}$$

where $m_r$ is an amount of time that has passed since the initial time, $h_{1/2}$ is a half-life of the forecasting algorithm, and $\alpha$ is a correction factor derived from historical data for the half-life weight, and wherein a combined confidence level is calculated according to:

$$\sum_{x=t}^{|T|}\sum_{f=0}^{|f|}f_f w_x * f_f(x)$$

where $$\sum_{x=t}^{|T|}$$

is a sum of all time slices taken during a life of the forecasting cohort, where $$\sum_{f=0}^{|f|}f_f w_x$$

is a sum of all forecasting algorithm weights, where $f_f w_x$ represents all half-life weights of the forecasting algorithms, and where $f_f(x)$ represents all forecasting algorithms in the forecasting cohort.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to generate a forecasting cohort of forecasting algorithms, wherein the forecasting cohort comprises a first set of forecasting algorithms of a first type of forecasting algorithm, and wherein the forecasting cohort further comprises a second set of forecasting algorithms of a second type of forecasting algorithm;

program instructions to determine a half-life of each of the first set of forecasting algorithms and the second set of forecasting algorithms, wherein the half-life describes a subsequent time at which a forecasting algorithm has reached half of its forecast horizon as measured from an initial time;

program instructions to determine a half-life weight for each of the first set of forecasting algorithms and the second set of forecasting algorithms, wherein half-life weights decrease an effect of a forecasting algorithm as time elapses;

program instructions to determine a confidence level of the forecasting cohort at the subsequent time, wherein the confidence level is based on the half-life weight of each of the first set of forecasting algorithms and the second set of forecasting algorithms;

program instructions to utilize the confidence level of the forecasting cohort at the subsequent time to adjust resource usage;

program instructions to receive sensor readings from a device, wherein the sensor readings describe current conditions of the device, and wherein the device includes resources;

program instructions to predict future usage of the resources in the device based on the confidence level of the forecasting cohort; and program instructions to reallocate the resources used by the device based on the predicted future usage.

17. The computer system of claim 16, wherein the resources used by the device are software resources.

18. The computer system of claim 16, wherein the resources used by the device are hardware resources.

19. The computer system of claim 16, wherein reallocated resources are in the device.

20. The computer system of claim 16, wherein the half-life weight of a forecasting algorithm is:

$$2^{-\frac{m_r}{h_{1/2}}*\alpha}$$

where $m_r$ is an amount of time that has passed since the initial time, $h_{1/2}$ is a half-life of the forecasting algorithm, and $\alpha$ is a correction factor derived from historical data for the half-life weight, and wherein a combined confidence level is calculated according to:

$$\sum_{x=t}^{|T|}\sum_{f=0}^{|f|}f_f w_x * f_f(x)$$

where $$\sum_{x=t}^{|T|}$$

is a sum of all time slices taken during a life of the forecasting cohort, where $$\sum_{f=0}^{|f|} f_f w_x$$

is a sum of all forecasting algorithm weights,
where
$f_f w_x$ represents all half-life weights of the forecasting algorithms, and where
$f_f(x)$ represents all forecasting algorithms in the forecasting cohort.

* * * * *